Patented Oct. 12, 1954

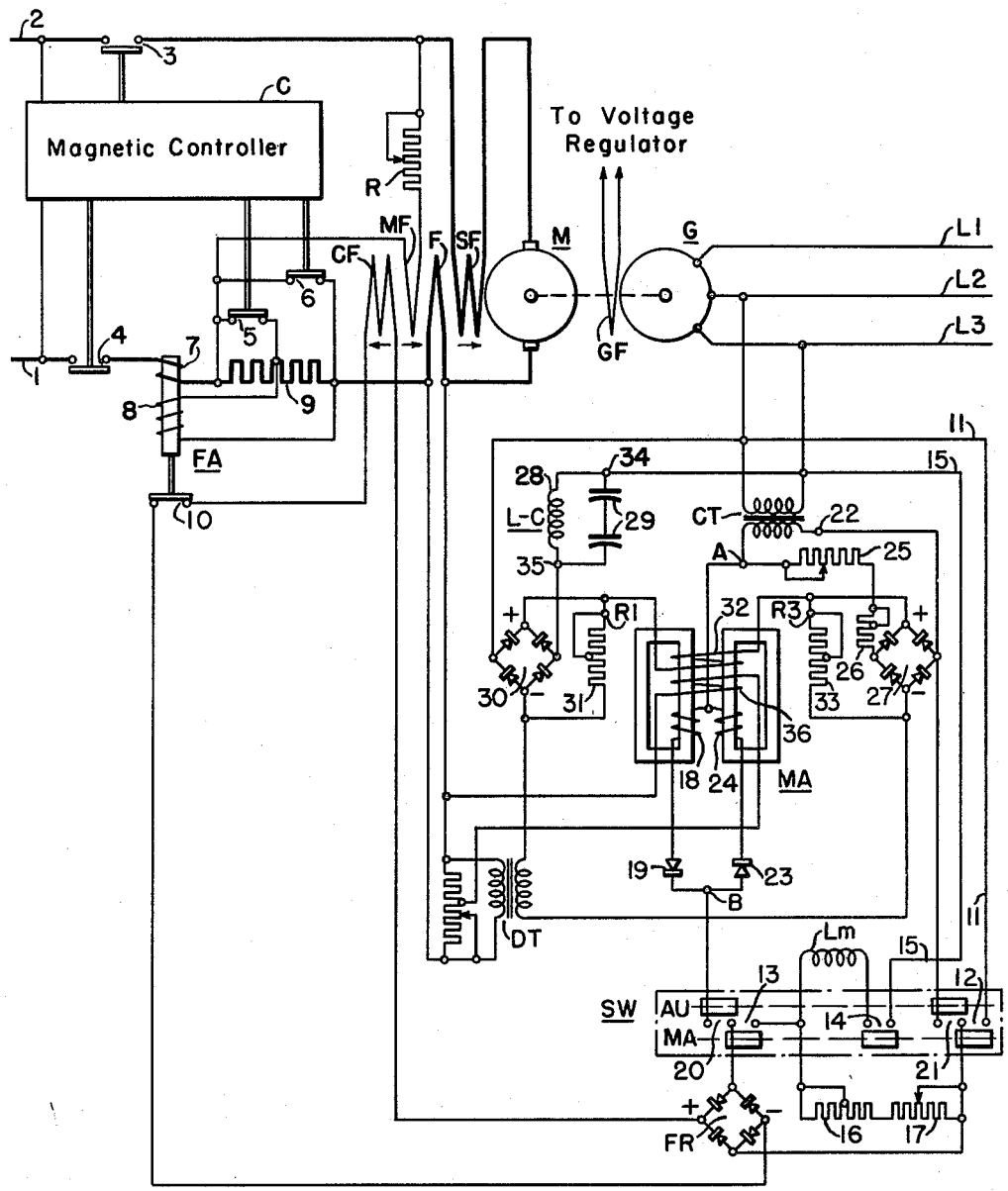

2,691,756

UNITED STATES PATENT OFFICE 2,691,756

MAGNETIC SPEED REGULATOR FOR MG SETS

Walter Schaelchlin and Gerhardt H. Piethe, Buffalo, N. Y., assignors to Westinghouse Electric Corporation, East Pittsburgh, Pa., a corporation of Pennsylvania Application December 20, 1950, Serial No. 201,832

7 Claims. (Cl. 322—24)

Our invention relates to electric control systems and more particularly to systems of control for maintaining the speed of operation of a direct current motor at a constant value.

Many devices on board of a ship require that the alternating current used by such devices be at a fixed frequency. The requirement is such that the frequency error must not exceed a small fraction of a percent of the required frequency. This is so regardless of the changes in load on the alternator or any changes in temperature of the electrical equipment.

One broad object of our invention is the provision of control means for obtaining a constant frequency alternating current from an alternator.

We are aware that others working in this field have made efforts to provide an absolutely constant generator speed to obtain constant frequency alternating current, but such prior art schemes have fallen short of the exacting requirements of the instruments and other devices used on modern vessels of defense.

One other broad object of our invention is the provision of frequency controlling devices having no moving parts, are not affected by vibration or shocks, such as caused by gun-fire, and above all are extremely accurate and reliable in performance.

A more specific object of our invention is the provision of frequency sensitive means for controlling the speed of operation of a direct current motor coupled to drive an alternator.

Other objects and advantages will become more apparent from a study of the following specification and the accompanying drawing, in which the single figure is a somewhat diagrammatic showing of our invention as applied to a motor generator set.

In the arrangement shown G represents the alternating current generator that is to supply alternating current of constant frequency and constant voltage to the leads L1, L2 and L3. These leads supply alternating current to the various instruments and other devices on board ship, as a submarine vessel, requiring a constant frequency supply.

The alternator is provided with the field winding GF connected to a suitable source of direct current so regulated that the voltage of the generator G remains constant. The regulating means to effect this result are not part of the invention herein disclosed. The invention herein disclosed includes a regulation of the speed of the generator G to obtain a constant speed. Such regulation will thus provide leads L1, L2 and L3 with a constant frequency.

The alternator is driven by the motor M. The motor M is provided with a separately excited shunt connected field MF, a series field SF, a control field CF, and a commutating field F.

The relative magnetic effects of the fields are evidence by the arrows adjacent the mentioned fields.

To get the optimum working range for our regulating system, and to avoid over-loading the regulating system we have provided the adjustable resistor R in series with the field MF. The resistance value of resistor R is chosen to be just large enough to produce the effect desired. The excitation of field MF is selected to be just strong enough to require differential ampere turns in the control field CF for all regulating conditions. The speed setting is thus not determined by the adjustment of the resistor R, but is determined by the adjustment of the rheostat 25 connected in series with the reference rectifier 27. The function just stated will become more apparent from the more detailed description of our invention given hereinafter.

The motor M and the fields F, MF, and SF are disposed to be connected to the direct current leads 1 and 2 by the controller C designed to close contacts 3 and 4 and then effect the opening of contacts 5 and 6 and later the closing of contacts 5 and 6 in the proper sequence to effect the proper acceleration of the motor M. The motor starting circuit is provided with the relay FA having actuating coils 7 and 8, energized respectively by the motor load current and the voltage across the starting resistor 9.

Operation of the FA relay during starting of the motor opens the contacts 10. The control field CF is thus not energized during starting of the motor. The motor thus starts with maximum torque and attains a constant speed slightly below the desired speed.

Normally during starting of the motor the selector switch SW is so positioned that the control field CF is subject to manual control, i. e., the lower contact segments bridge the contact fingers of the selector switch SW.

Assuming that contacts 3 and 4 have been closed, that contacts 5 and 6 have reclosed in the proper sequence, that contacts 10 have reclosed, and that the selector switch is in the MA, or manual, position. The control field CF will then be energized with direct current from the field rectifier FR. This field rectifier, a full-wave rectifier, is in turn energized with alternating current from the leads L2 and L3. The energizing circuit may be traced from lead L2 through conductor 11, contacts 12, the alternating current terminals of the rectifier FR, contacts 13, reactor Lm, contacts 14, and conductor 15 to lead L3. It will be noted that the resistor 16 and the rheostat 17 are connected in shunt circuit relation to the field rectifier FR. By increasing the effective resistance of this shunt circuit, by suitable manipulation of the rheostat 17, the field excitation of the control field CF is increased and in consequence the motor speed is increased, and by decreasing the resistance of the shunt circuit the excitation of the control field CF is decreased and in consequence the motor speed is decreased.

By suitable manipulation of the rheostat 17 a speed for motor M can be found to provide the proper frequency of the alternating current on leads L1, L2 and L3. The manual speed control of motor M is, however, not the main or important feature of our invention.

We provide an effective automatic motor speed control by regulating the excitation of the control field CF from a static frequency responsive unit connected to the output terminals, as leads L2 and L3, of the generator G.

In the particular application we have made of our apparatus, the apparatus, for automatic control, is required to maintain a motor speed of 1800 R. P. M., corresponding to 60 cycles/sec. of generated voltage. Our control is not limited, however, to a particular motor speed or alternating current frequency. For some applications, a frequency of 400 cycles/sec. is most desirable.

To effect the proper control the control field CF is connected differentially to the main field MF. This means that when the motor speed is below normal the control field must supply sufficient field weakening ampere turns to increase the motor speed. The motor design is such that under all conditions some field weakening ampere turns are provided by field CF to maintain the normal speed.

For automatic operation, the selector switch SW is moved to the AU, or automatic, position. This operation, at contacts 13, opens the shunt circuit for the rectifier FR and also, at contacts 12 and 14 disconnects the rectifier from the energized conductors 11 and 15. The rectifier FR is, however, connected to output terminals of the control transformer CT. The circuit for the field energizing rectifier FR, and thus the control field CF, may, when junction A is positive, be traced from junction A through the left-hand winding 18 of the magnetic amplifier MA, the rectifier 19, junction B, contacts 20, the rectifier FR, field CF, contacts 10, rectifier FR, contacts 21, to the other terminal 22 of the secondary of the control transformer CT. When the terminal 22 is positive the circuit may be traced from this terminal 22 through contacts 21, rectifier FR, field CF, contacts 10, rectifier FR, contacts 20, junction B, rectifier 23, the right-hand coil 24 of the magnetic amplifier MA to the junction A.

The magnetic amplifier may be considered that portion of the showing between junctions A and B. Essentially a magnetic amplifier includes, among other elements, a variable inductance which is controlled by pre-magnetization of the magnetic core of the amplifier with auxiliary low power control windings. For the field circuits traced, it is apparent that the excitation of the control field CF can be varied by raising or lowering the reactive impedance of the magnetic amplifier.

In our control apparatus, we utilize a static frequency responsive circuit. This frequency detecting circuit consists of a bridge network in which one leg is made up of the adjustable speed determining rheostat 25, the resistor 26, and the full-wave rectifier 27. The other leg includes a parallel resonant L-C circuit consisting of a reactor 28 and two series connected capacitors 29 connected in parallel to the reactor 28, all connected in series with the full wave rectifier 30.

Since the upper terminals R1 and R3 of the respective resistors 31 and 33 are both positive and the control coil 32 of the magnetic amplifier is connected across these terminals, it is apparent that if the direct current voltage appearing across the resistor 33 is considered to be the reference then the direct current voltage appearing across the resistor 31 serves as the regulating, or correcting, voltage.

The reactor 28 and the associated capacitors 29 are tuned for parallel resonance somewhat below 60 cycles so that when the motor is operating below the speed to provide a 60 cycle alternating current from the generator G, the impedance between junctions 34 and 35 increases. This lowers the voltage appearing across resistor 31 and thus effects a current flow from junction or terminal R3 through control coil 32, terminal R1, resistor 31, the right-hand winding of the damping transformer DT, resistor 33 back to terminal R3. For the particular direction of the current flow through coil 32 the pre-magnetization of the magnetic amplifier is increased. The impedance of the amplifier is thus decreased. The result is that the current in the control field CF is increased and the motor speed goes up to normal.

When the motor is above the desired speed, the current flow in coil 32 is decreased or is reversed depending on the motor speed and also on the calibration of the circuits effected by the adjustment of the rheostat 25 and other parts of the circuits should such adjustment be necessary. The impedance of the amplifier is now increased. The field excitation of field CF is decreased to decrease the motor speed back to normal.

The bridge detector circuit also has the valuable function of compensating for generator voltage variations. As the generator voltage varies slightly, the bridge type regulator circuit minimizes the effect since both legs receive the same degree of variation.

The magnetic amplifier is also provided with an auxiliary control winding 36. This winding 36 is connected across a selected portion of an adjustable resistance shunt connected across the commutating field F. This circuit arrangement provides for load compensation. This is apparent from the fact that the current in coil 36 varies directly with the load current of the motor M. The regulator thus has a droop, or lower regulated speed as the load increases from no-load to full-load.

The auxiliary winding 36 is also connected to the damping transformer by the circuits shown. This damping transformer is connected to the commutating field F as shown.

The damping transformer secondary is connected in series with resistor 31 and of a polarity such that the damping transformer secondary voltage adds or subtracts in opposition to the speed signal voltage across resistor 31. Since transient load changes result in similar voltage changes across the commutating field, proper stabilizing feed-back is obtained by connecting the damping transformer primary to the commutating field. Winding 36 is primarily used to provide a droop in the characteristic when it is necessary to parallel two or more machines.

These transient changes of motor armature current are fed back in a direction through winding 36 to oppose the effect of the control winding 32. After the transient condition is damped out, winding 36 has no other effect on the steady state performance except to provide a speed drop as the load increases.

While we have shown and described but a single embodiment of our invention it is apparent that others skilled in the art, particularly after having had the benefit of the teachings of our disclosure, may devise modifications within the spirit of our invention. We, therefore, do not wish to be limited to the single circuit arrangement shown but only by the scope of the claims hereto appended.

We claim as our invention:

1. In an electric control for a motor generator set, in combination, an alternator connected to supply leads for supplying alternating current to said leads, a direct current motor, energized from a suitable source of constant potential direct current, coupled to drive the alternator, said motor having a main field, a differentially connected control field and a commutating field, a magnetic amplifier including load circuit windings connected to energize the control field with variable direct current to control the speed of the motor, a static frequency responsive unit responsive to the frequency of the voltage supplied to said leads, and a control winding for said amplifier connected to said static frequency responsive unit to thus effect a change in the excitation of the control field to thus change the motor speed in a sense opposite to the frequency change, an auxiliary control winding for the amplifier connected to the commutating field to be energized as a direct function of the motor load current to provide load compensation.

2. In an electric control for a motor generator set, in combination, an alternator connected to supply leads for supplying alternating current to said leads, a direct current motor, energized from a suitable source of constant potential direct current, coupled to drive the alternator, said motor having a main field, a differentially connected control field and a commutating field, a magnetic amplifier including load circuit windings connected to energize the control field with variable direct current to control the speed of the motor, a static frequency responsive unit responsive to the frequency of the voltage supplied to said leads, and a control winding for said amplifier connected to said static frequency responsive unit to thus effect a change in the excitation of the control field to thus change the motor speed in a sense opposite to the frequency change and a damping transformer interconnected with the commutating field and the control windings of the amplifier to provide stabilization control components during transient load changes.

3. In an electric control for a motor generator set, in combination, an alternator connected to supply leads for supplying alternating current to said leads, a direct current motor, energized from a suitable source of constant potential direct current, coupled to drive the alternator, said motor having a main field, a differentially connected control field and a commutating field, a magnetic amplifier including load circuit windings connected to energize the control field with variable direct current to control the speed of the motor, a static frequency responsive unit responsive to the frequency of the voltage supplied to said leads, and a control winding for said amplifier connected to said static frequency responsive unit to thus effect a change in the excitation of the control field to thus change the motor speed in a sense opposite to the frequency change, an auxiliary control winding for the amplifier connected to the commutating field to be energized as a direct function of the motor load current to provide load compensation and a damping transformer interconnected with the commutating field and the control windings of the amplifier to provide stabilization control components during transient load changes.

4. In an electric system of control, in combination, a motor-generator set, the motor being a direct current motor having an armature winding, a main field winding, a control field winding, said armature winding, and main field winding being connected to a suitable constant potential source of direct current so that the motor normally runs, in the absence of any excitation current in the control field winding, at a selected speed lower than a certain selected desirable speed and the generator being an alternator coupled to the motor and connected to at least two leads on which the frequency is to be constant, a resonant inductance-capacitance circuit and a first full-wave rectifier connected in series therewith connected to said leads, a resistance circuit and a second full-wave rectifier also connected to be energized from said leads, a first resistor connected across the direct current terminals of the first rectifier, a second resistor connected across the second rectifier, a magnetic amplifier having a connection to one of said leads, a main coil on the amplifier, rectifying means, the control field of the motor to another of said leads, a control winding for the magnetic amplifier connected across the positive terminals of said first and second resistors, whereby the magnitude of the energization of the control winding with reference to any given energization of the control winding is changed with changes of the difference of the positive potential at the positive terminals of the first resistor and second resistor, the changes in energization of the control winding changing the impedance of the magnetic amplifier to thus change the excitation of the control field in the same sense as the change in frequency of the current supplied to the said leads.

5. In an electric system of control, in combination, a motor-generator set, the motor being a direct current motor having an armature winding, a main field winding, a control field winding and a commutating field winding, said armature winding, commutating field winding, and main field winding being connected to a suitable constant potential source of direct current so that the motor normally runs, in the absence of any excitation current in the control field winding, at a selected speed lower than a certain selected desirable speed and the generator being an alternator coupled to the motor and connected to at least two leads on which the frequency is to be constant, a resonant inductance-capacitance circuit and a first full-wave rectifier connected in series therewith connected to said leads, a resistance circuit and a second full-wave rectifier also connected to be energized from said leads, a first resistor connected across the direct current terminals of the first rectifier, a second resistor connected across the second rectifier, a magnetic amplifier having a load circuit including a connection to one of said leads, a main coil on the amplifier, rectifying means, the control field of the motor to another of said leads, a control winding for the magnetic amplifier connected across the positive terminals of said first and second resistors, whereby the magnitude of the energization of the control winding with reference to any given energization of the control winding is changed with changes of the difference of the positive potential at the positive terminals of the first resistor and second resistor, a second control winding for the amplifier connected across the commutating field to thus provide load compensation for the control, the changes in energization of the control winding changing the impedance of the magnetic amplifier to thus change the excitation of the control field in the same sense as the change in frequency of the current supplied to the said leads.

6. In an electric system of control, in combination, a motor-generator set, the motor being a direct current motor having an armature winding, a main field winding, a control field winding and a commutating field winding, said armature winding, commutating field winding, and main field winding being connected to a suitable constant potential source of direct current so that the motor normally runs, in the absence of any excitation current in the control field winding, at a selected speed lower than a certain selected desirable speed and the generator being an alternator coupled to the motor and connected to at least two leads on which the frequency is to be constant, a resonant inductance-capacitance circuit and a first full-wave rectifier connected in series therewith connected to said leads, a resistance circuit and a second full-wave rectifier also connected to be energized from said leads, a first resistor connected across the direct current terminals of the first rectifier, a second resistor connected across the second rectifier, a magnetic amplifier having a load circuit including a connection to one of said leads, a main coil on the amplifier, rectifying means, the control field of the motor to another of said leads, a control winding for the magnetic amplifier connected across the positive terminals of said first and second resistors, whereby the magnitude of the energization of the control winding with reference to any given energization of the control winding is changed with changes of the difference of the positive potential at the positive terminals of the first resistor and second resistor, a damping transformer having one winding connected across the commutating field and the other winding interconnected with the control winding of the magnetic amplifier to thus provide a stabilizing effect as a function of the motor load current, the changes in energization of the control winding changing the impedance of the magnetic amplifier to thus change the excitation of the control field in the same sense as the change in frequency of the current supplied to the said leads.

7. In an electric system of control, in combination, a motor-generator set, the motor being a direct current motor having an armature winding, a main field winding, a control field winding and a commutating field winding, said armature winding, commutating field winding, and main field winding being connected to a suitable constant potential source of direct current so that the motor normally runs, in the absence of any excitation current in the control field winding, at a selected speed lower than a certain selected desirable speed and the generator being an alternator coupled to the motor and connected to at least two leads on which the frequency is to be constant, a resonant inductance-capacitance circuit and a first full-wave rectifier connected in series therewith connected to said leads, a resistance circuit and a second full-wave rectifier also connected to be energized from said leads, a first resistor connected across the direct current terminals of the first rectifier, a second resistor connected across the second rectifier, a magnetic amplifier having a load circuit including a connection to one of said leads, a main coil on the amplifier, rectifying means, the control field of the motor to another of said leads, a control winding for the magnetic amplifier connected across the positive terminals of said first and second resistors, whereby the magnitude of the energization of the control winding with reference to any given energization of the control winding is changed with changes of the difference of the positive potential at the positive terminals of the first resistor and second resistor, a damping transformer having one winding connected across the commutating field and the other winding interconnected with the control winding of the magnetic amplifier to thus provide a stabilizing effect as a function of the motor load current, a second control winding for the amplifier connected across the commutating field to thus provide load compensation for the control, the changes in energization of the control winding changing the impedance of the magnetic amplifier to thus change the excitation of the control field in the same sense as the change in frequency of the current supplied to the said leads.

References Cited in the file of this patent

UNITED STATES PATENTS

| Number | Name | Date |
|---|---|---|
| 1,981,040 | Gulliksen | Nov. 20, 1934 |
| 2,254,899 | Laubenheimer et al. | Sept. 2, 1941 |

FOREIGN PATENTS

| Number | Country | Date |
|---|---|---|
| 205,102 | Great Britain | June 26, 1924 |